(12) United States Patent
Roudet et al.

(10) Patent No.: US 6,878,176 B2
(45) Date of Patent: Apr. 12, 2005

(54) AIR CONDITIONING FILTER

(75) Inventors: Christophe Roudet, Beauvais (FR);
Bertrand Budin, Haudivilliers (FR)

(73) Assignee: Agco, S.A., Beauvais (FR)

( * ) Notice: Subject to any disclaimer, the term of this patent is extended or adjusted under 35 U.S.C. 154(b) by 45 days.

(21) Appl. No.: 10/277,168

(22) Filed: Oct. 21, 2002

(65) Prior Publication Data
US 2003/0131572 A1 Jul. 17, 2003

(30) Foreign Application Priority Data
Oct. 26, 2001 (GB) .............................................. 0125694

(51) Int. Cl.$^7$ .......................... B01D 46/10; B01D 35/16
(52) U.S. Cl. .......................... 55/357; 55/385.3; 55/422; 55/433; 55/481; 55/504
(58) Field of Search ............................... 55/357, 385.1, 55/385.3, 392, 394, 422, 432, 433, 478, 481, 490, 494, 504

(56) References Cited

U.S. PATENT DOCUMENTS

| | | | |
|---|---|---|---|
| 3,823,532 A | * | 7/1974 | Cooper et al. ................. 55/357 |
| 4,002,443 A | | 1/1977 | Lorenz |
| 4,140,047 A | | 2/1979 | Bowman et al. |
| 4,242,951 A | * | 1/1981 | Bemiss ........................ 454/146 |
| 4,251,246 A | * | 2/1981 | Andreychek ................. 55/481 |
| 4,292,060 A | * | 9/1981 | Sakakibara et al. ......... 55/385.1 |
| 4,587,890 A | | 5/1986 | Hurlburt |
| 4,629,479 A | * | 12/1986 | Cantoni .......................... 96/55 |
| 4,796,719 A | * | 1/1989 | Shiratsuchi ................. 180/219 |
| 6,231,630 B1 | * | 5/2001 | Ernst et al. ................. 55/385.3 |
| 6,598,580 B2 | * | 7/2003 | Baumann et al. ......... 123/198 E |

FOREIGN PATENT DOCUMENTS

| | | |
|---|---|---|
| CA | 1176907 | 10/1984 |
| DE | 195 43 699 | 5/1997 |
| EP | 275373 | 10/1987 |

* cited by examiner

Primary Examiner—Robert H. Spitzer
(74) Attorney, Agent, or Firm—MacMillan, Sobanski & Todd, LLC

(57) ABSTRACT

A vehicle includes an operator's cab having an air inlet and an air filtration system, and an air outlet, wherein the air filtration system comprises a filter element, and a filter container for receiving the filter element, the operator's cab comprising a chamber for receiving the filter container housing the filter element, the filter container being movable into and out of the chamber between a filtering position and an emptying position, wherein with the container in the emptying position the filter element may be removed from the container, and the container emptied of debris, and wherein the filter container comprises at least one air inlet opening and at least one air outlet opening, and wherein with the container in the filtering position the openings are aligned with the air inlet and air outlet such that air may be drawn through the filter into the cab.

18 Claims, 5 Drawing Sheets

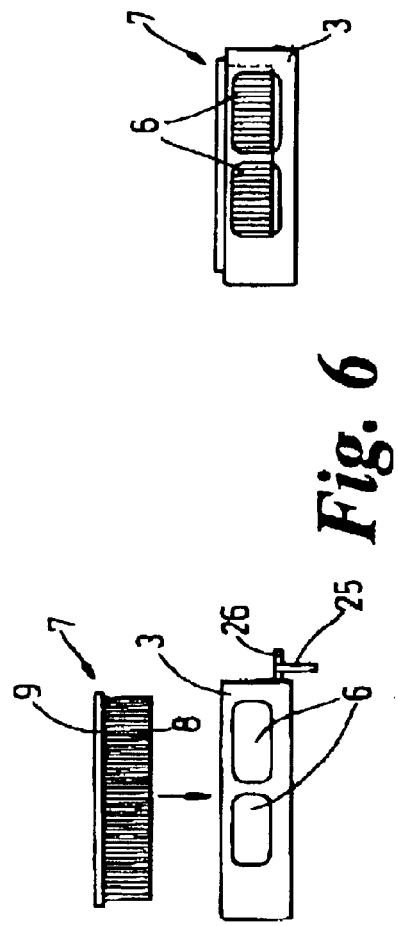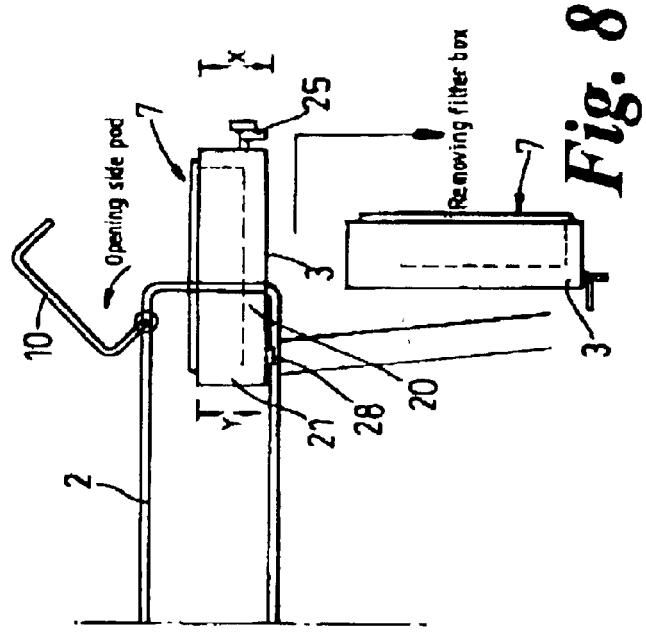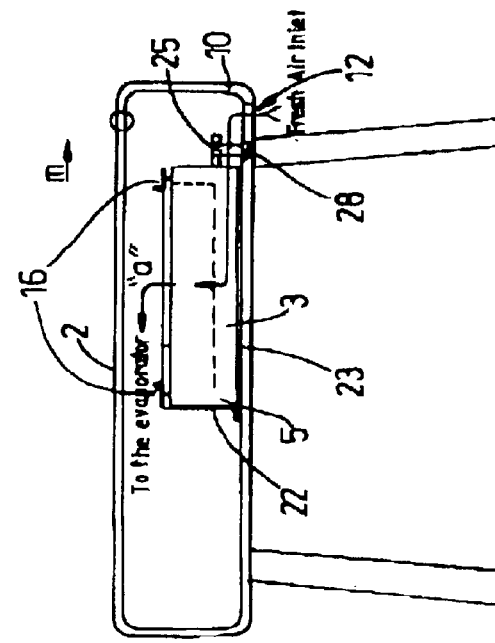

AIR CONDITIONING FILTER

BACKGROUND OF THE INVENTION

This invention relates in general to air conditioning for vehicles, and in particular to the housing of the filter of such an air conditioning unit.

Vehicles, such as agricultural tractors and combine harvesters, work in dusty environments. A requirement exists for air entering the operator's cab of such vehicles to be filtered in order to remove dust particles. Furthermore, such vehicles are often fitted with air conditioning to maintain the temperature of the operator's cab at an acceptable level. There is a requirement to filter out dust particles from the air entering an air conditioning system in order to prevent the condenser from becoming blocked. It is necessary to clean or change air filter elements relatively frequently.

In a current system, the air filtering elements of the air conditioning unit are located in the roof of the cab. They are accessed by removing a hatch on the top of the roof. In order to complete this task it is necessary for the person removing the filter elements to stand on the set in the tractor cab with his upper body passing through the hatch.

In another system currently on the market, the filtering element is held in the side of the roof canopy. One problem associated with this arrangement is that the filter element is long, flexible, and difficult to manipulate. During the procedure of removing the filter from its housing, dust may fall out of the filter element.

The object of the invention is, therefore, to provide an improved arrangement for housing the filter element of an air conditioning system for a vehicle having a cab.

SUMMARY OF THE INVENTION

The invention provides a vehicle comprising an operator's cab having an air inlet, an air filtration system, and an air outlet, wherein the air filtration system comprises a filter element and a filter container for receiving the filter element. The operator's cab comprising a chamber for receiving the filter container housing the filter element, the filter container being moveable into and out of the chamber between a filtering position and an emptying position, wherein with the container in the emptying position the filter element may be removed from the container and the container emptied of debris. The filter container comprises at least one air inlet opening and at least one air outlet opening. With the container in the filtering position, the openings are aligned with the air inlet and air outlet such that air may be drawn through the filter into the cab.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is a schematic representation of the filter and filter housing according to a second embodiment of the invention.

FIG. 7 is a front view of a cab comprising an air conditioning filter housing according to a second embodiment of the invention.

FIG. 8 is a front view of the cab shown in FIG. 7 and illustrating access to the second embodiment of the filter.

DETAILED DESCRIPTION OF THE PREFERRED EMBODIMENT

Figure 1:
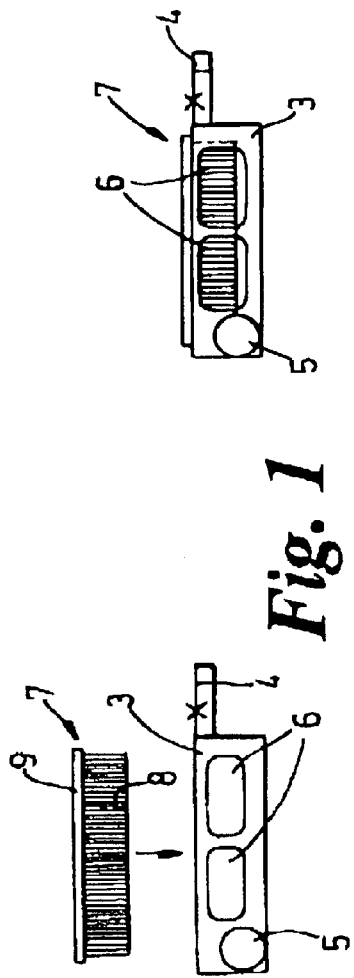
FIG. 1 is a schematic representation of the filter and filter housing according to a first embodiment of this invention.
Figure 3:
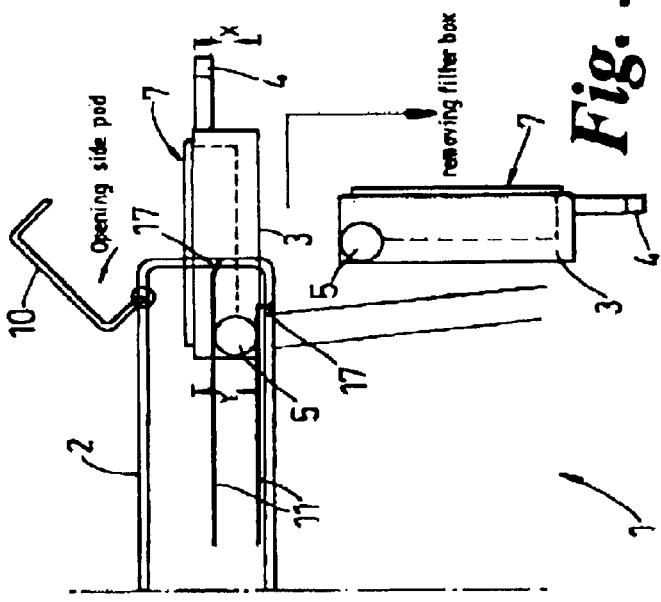
FIG. 3 is a front view of a portion of the cab shown in FIG. 2 and illustrating access to the first embodiment of the filter.
Figure 2:
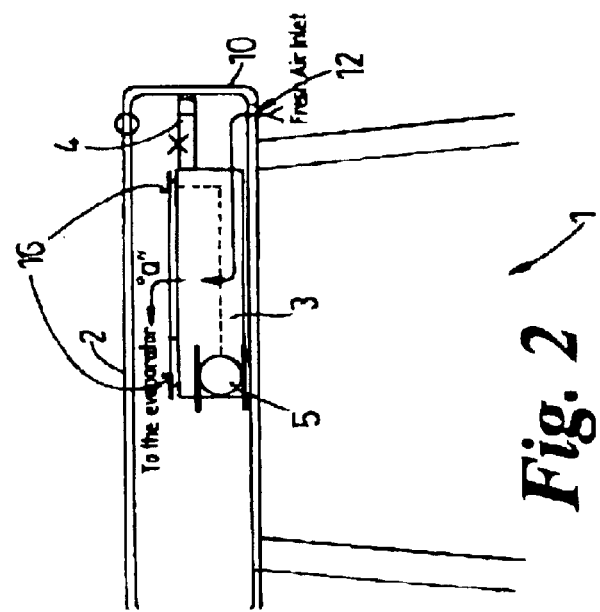
FIG. 2 is a front view of a cab comprising an air conditioning filter housing according to the first embodiment of the invention.

Referring now to FIGS. 1 to 4, there is shown a cab 1 having a roof 2. A filter container 3 is removably mounted in the roof 2, access to the container being provided by hatch 10. Hatch 10 is pivotally attached to the structure of roof 2 of the cab 1 and can be removed from a closed position, as shown in FIG. 2, to an open position, as shown in FIG. 3. The hatch 10 comprises a suitable fastener to fasten the hatch 10 in the position shown in FIG. 2.

The container 3 consists of five sides, the top being completely open in order that the filter 7 may be freely placed in and removed from the container 3. The base and one side of the container are continuous, whilst the continuity of one side and one of the ends are interrupted by openings 6. The openings 6 provide pathways for air to be drawn from outside through the elements 8 of the filter 7 and into the cab. Also, air from the cab may re be re-circulated from the cab, through the filter, and back to the cab.

Figure 5:
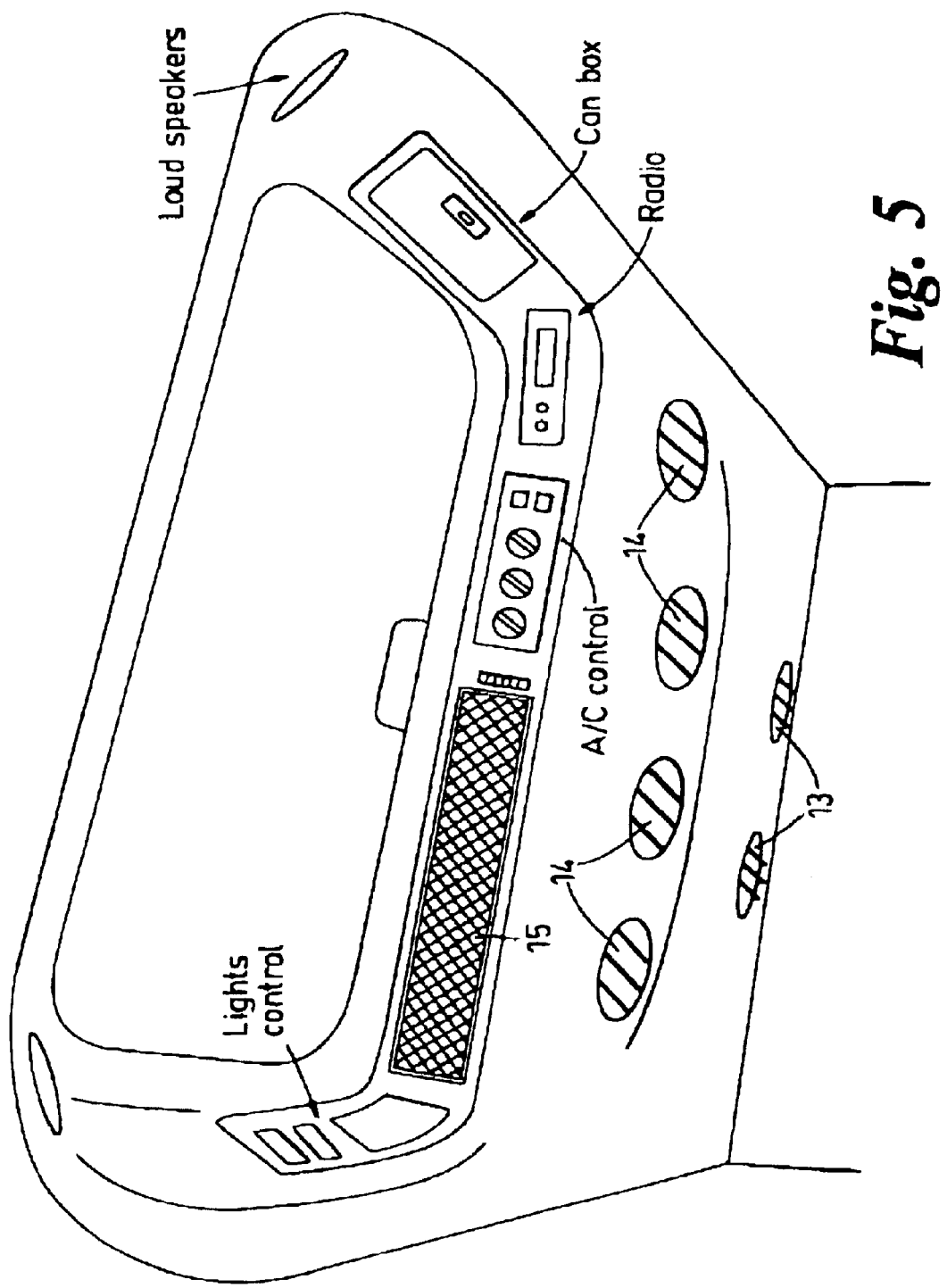
FIG. 5 is a schematic representation of the interior of a cab comprising an air conditioning filter housing according to the first embodiment of the invention.
Figure 9:
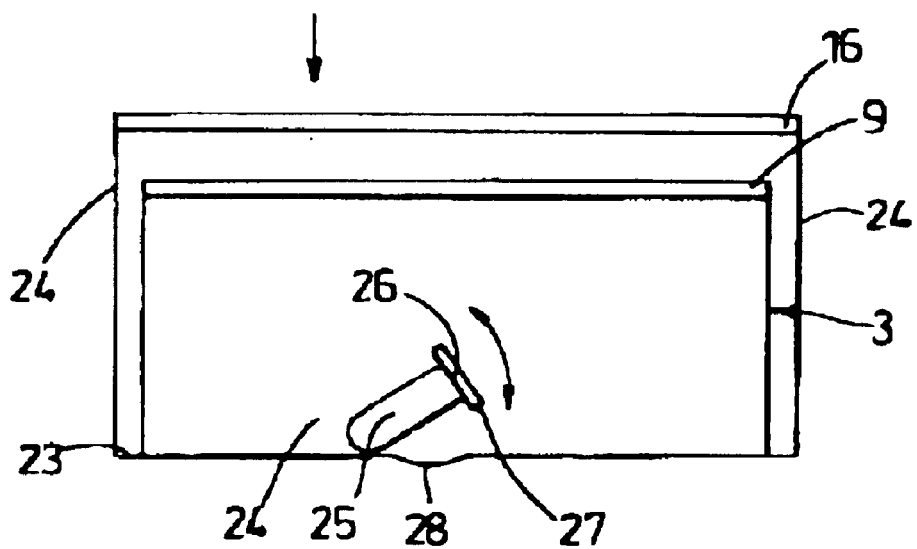
FIG. 9 is front view of the second embodiment of the filter container with the locking arrangement in the releasing position.
Figure 10:
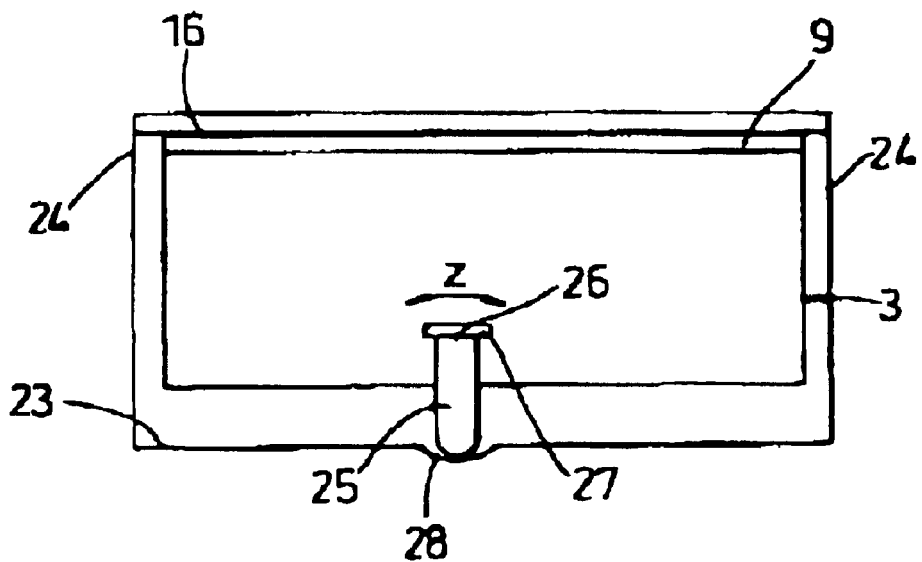
FIG. 10 is a front view of the second embodiment of the filter container with the locking arrangement in the locking position.

FIGS. 2 and 5 illustrate the path taken by fresh air drawn in from outside the cab. The roof 2 of the cab 1 comprises an air inlet 12. Air is drawn through the inlet and through the elements 8 of the filter 7, the filtered air egressing the filter through the top 9, which comprises suitable apertures. The filtered air passes through ducting and, if required, the air conditioning unit before entering the cab 1 through vents 13 and 14. The cab comprises a recirculation door 15. When the driver wishes to re-circulate the air in the cab, rather than drawing in fresh air from outside the cab, air is drawn through the grille 15 and via filter 7 back into the cab through vents 13, 14.

Rails 11 are mounted inside the roof. As can be seen from FIG. 3, the ends of the upper and lower rails 11 are bent in order to facilitate insertion and removal of the filter container 3 from the roof. The filter container 3 comprises bosses 5 on opposite sides of the container. The bosses 5 are substantially circular and are of diameter slightly less than the distance between the upper and lower rails 11 measured in the vertical direction, thereby providing a sliding fit between the bosses 5 and the rails 11. The rails 11 may be formed by plastics mouldings. In one embodiment, the ends of the rail 11 proximal the hatch 10 comprise indents 17 into which the bosses 5 may drop, thereby permitting the container 3 to be brought into a position where the end of the container distal from the bosses 5 is lower than the bosses, without the container being detached from the cab (see FIG. 3). This feature facilitates emptying because the operator does not need to hold both ends of the container whilst removing and/or replacing the filter cartridge.

FIG. 2 shows that when the container 3 complete with the filter 7 is inserted into the roof of the cab, the filter 7 is held in place by frame members 16 which press down on the top 9 of the filter, thereby preventing upward movement of the filter 7. This ensures that air entering the container 3 via the fresh air inlet and air intake holes 6 in the container 3 may only pass into the cab through the top 9 of the filter 7 as shown by the arrow "a" in FIG. 2. Absent a seal between the container 3 and the top 9 of the filter 7, air could pass into the cab without passing through the filter.

The height x of the end of container 3 closest to the hatch 10 is greater than the height y of the end of the container 3 distal from the hatch. Hence, the base of the container 3 is at a slight angle to the horizontal, falling towards the hatch 10. With the engine of the vehicle running, small vibrations are induced in the vehicle's chassis. These vibrations are transmitted, albeit in attenuated form, to the driver's cab 1. The vibrations cause the dust filtered from air passing through the filter element 8 to move towards the end of the container closest to the hatch 10. Equally, the rails 11 may be mounted in the roof 2 of the cab such that they are at a slight angle to the horizontal, thereby disposing the container 3 at a slight angle to the horizontal.

Figure 4:
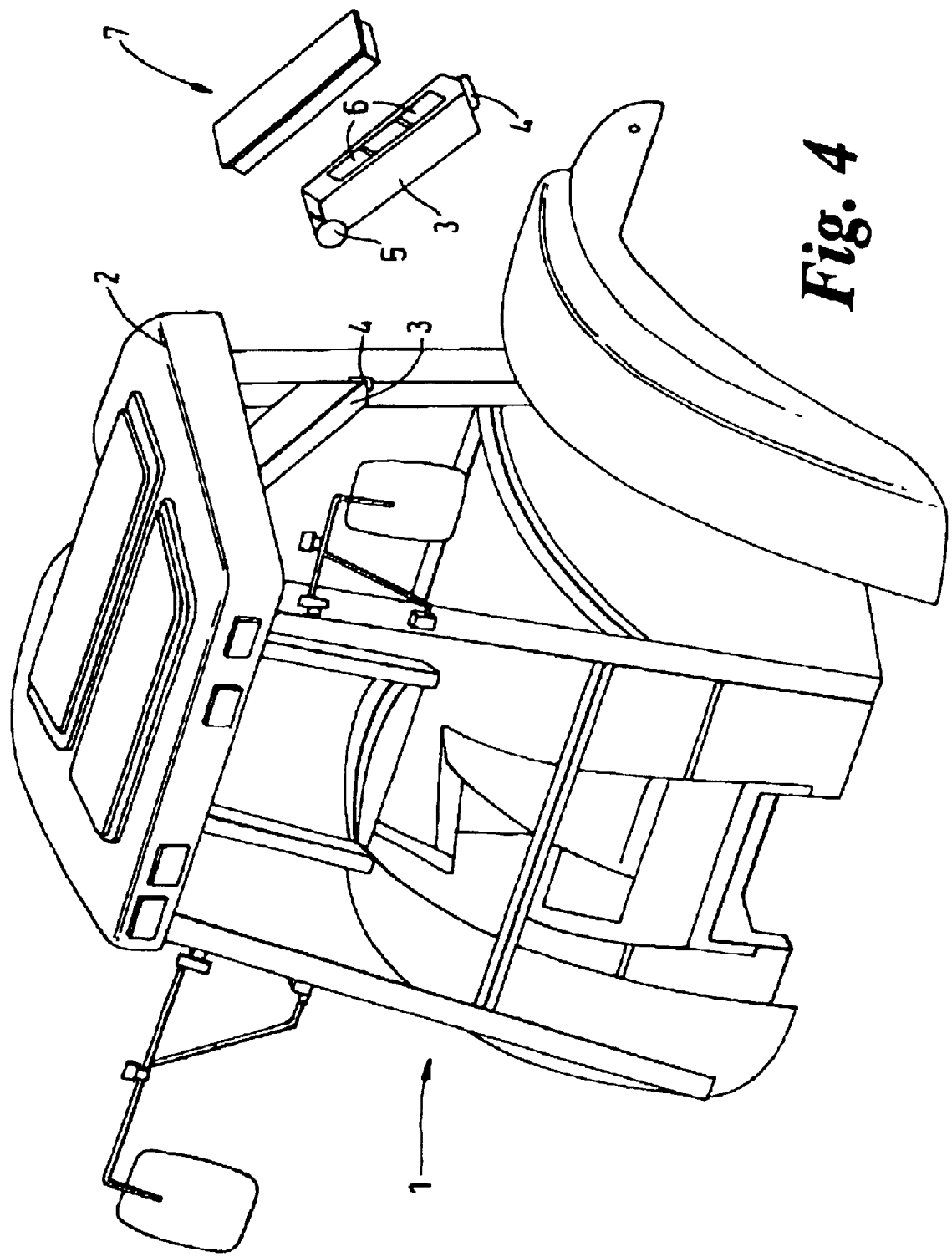
FIG. 4 is a schematic representation of a cab comprising an air conditioning filter housing according to the first embodiment of the invention.

As can be seen from FIG. 4, the recess into which the container 3 slides is located just above the door which gives access to the operator's cab. Placing the filter in this position renders changing and/or cleaning the element an easy task. To change or clean the filter, the operator opens the hatch 10, grips the handle 4, and pulls the container 3, with the filter 7, out of the recess. The bosses 5 locate in indents 17 in the slides, and the container 3 is allowed to pivot downwards into the position shown in FIG. 4. The operator may then remove the filter 7 for cleaning or replacement. Dust accumulated in the container will fall out of the container through the opening 6 in the end of the container.

The container 3 may be completely removed from the recess by lifting it out of the indents 17.

A second embodiment of the invention is illustrated in FIGS. 6 to 10. Where appropriate, like numerals are used to reference like parts. The filter container 3 is similar to that of the first embodiment. However, it is of simpler design, insofar as the sides 20 do not comprise bosses or wheels extending therefrom. The roof 2 of the operator's cab comprises a chamber defined by an end wall 22, a floor 23, and sides 24. As with the first embodiment, the chamber includes frame members 16 extending across the upper part of the chamber. As shown in FIG. 7, with the filter container in the filtering position, the top 9 of the filter element presses upwardly against the frame members 16, which resist the upward force to securely fasten the filter element in position in the filter container 3. The frame members could be replaced by other structures against which the filter element may be pressed. For example, the chamber may comprise a substantially flat ceiling formed for a material having sufficient stiffness to resist the upward force exerted by the filter element.

In order to install the filter container in the filtering position, an operator slides it into the chamber until the container comes to rest against a stop, which in this case is the end wall 22 of the chamber. A locking arrangement comprises a cam member 25 rotatably mounted on to the filter container 3 by a pin 26. A handle 27 is attached to the cam member 25. By gripping the handle 27, an operator can rotate the cam member 25 in the direction indicated by the arrow "z". The operator can also grip the handle to withdraw the container 3 from or insert the container 3 into the chamber.

It is desirable to lock the container 3 in the position shown in FIG. 7. This is done by rotating the cam member 25 from the position shown in FIG. 9 to that shown in FIG. 10, where the cam member 25 is substantially vertical, and is engaged with an indent 28. Engagement of the cam member 25 with the indent 28 serves two purposes. First, movement of the container in the direction indicated by arrow "m" in FIG. 7 is prevented. Second, the filter container is lifted upwardly so the top of the filter 9 engages with the frame members 16 to hold the filter element in place in the container 3.

The hatch 10 shown in FIGS. 6 to 8 functions in the same manner as the hatch 10 shown in FIGS. 1 to 3.

As with the first embodiment, the floor of the filter container 3 is set a slight angle below the horizontal so the dust and debris settles towards the end of the filter container 3 proximal the hatch 10.

The invention provides for easy access to the filter and for the filter to be held in the container as it is extended from the cab. The container collects any dust falling from the filter both prior to and during removal of the filter element. The potential for exposure of the vehicle operator to dust during the cleaning and/or replacement of the filter is much reduced by this invention.

What is claimed is:

1. A vehicle comprising an operator's cab having an air inlet, an air filtration system, and an air outlet, wherein the air filtration system comprises a filter element and a filter container for receiving the filter element, the operator's cab comprising a chamber for receiving the filter container housing the filter element, the filter container being slidable into and out of the chamber between a filtering position and an emptying position, wherein with the container in the emptying position, the filter element may be removed from the container and the container emptied of debris, and wherein the filter container comprises at least one air inlet opening and at least one air outlet opening, and wherein with the container in the filtering position, the openings are aligned with the air inlet and air outlet such that air may be drawn through the filter into the cab.

2. A vehicle according to claim 1, wherein the container comprises a base and four sides, and wherein at least one aperture is located in the sides of the container.

3. A vehicle according to claim 1, wherein the vehicle further comprises a locking arrangement for the locking the filter container in the filter position.

4. A vehicle according to claim 3, wherein the locking arrangement comprises a cam pivotally mounted on the container and pivotable between a filter container locking position, in which the cam engages with the chamber, and a filter container releasing position, in which the cam is disengaged from the chamber.

5. A vehicle according to claim 4, wherein the chamber comprises an indent, the cam engaging with the indent in the locking position.

6. A vehicle according to claim 1, wherein the container comprises a handle.

7. A vehicle according to claim 6, wherein the handle is attached to the cam.

8. A vehicle according to claim 1, wherein the chamber includes slides comprising two pairs of rails, wherein the rails of a pair are spaced apart in a vertical direction, and wherein the pairs of rails are spaced apart in a horizontal direction.

9. A vehicle according to claim 1, wherein the container comprises at least one boss member which co-operates with a slide to facilitate sliding of the container into and out of the chamber.

10. A vehicle according to claim 9, wherein one or more of the at least one boss members consists of a wheel.

11. A vehicle according to claim 1, wherein the upper part of the chamber comprises at least one element arranged to exert a downward force on the upper part of the filter element when the container is in its filtering position.

12. A vehicle according to claim 11, wherein the at least one element comprises a pair of spaced apart members spaced and located such that with the container and filter element in the filtering position the members exert a downward force on the upper surface of the filter element, substantially on the perimeter of thereof.

13. A vehicle according to claim 1, wherein the container is disposed within a recess within the chamber, and wherein the recess extends into the roof of the operator's cab in a direction substantially perpendicular to the longitudinal direction of the vehicle.

14. A vehicle according to claim 1, wherein the base of the container slopes downward towards the end of the container nearest the side of the vehicle.

15. A vehicle according to claim 14, wherein with the container in the filtering position, the upper surface of the container is substantially horizontal, and wherein depth of the inner end wall of the container is smaller than the depth of the outer end wall of the container.

16. A vehicle according to claim 1, comprises at least one boss member which co-operates with a slide to facilitate sliding of the container into and out of the chamber wherein the container is disposed within a recess within the chamber, and wherein the slide comprises pivot means which enable the container to pivot about a pivot axis when withdrawn from the recess.

17. A vehicle according to claim 16 wherein the pivot means comprises an indent in the slide, and wherein the container comprises at least one pivot member which locates in the indent when the container is withdrawn from the recess.

18. A vehicle according to claim 1, further comprising an air conditioning unit downstream of the filter.

* * * * *

UNITED STATES PATENT AND TRADEMARK OFFICE
CERTIFICATE OF CORRECTION

PATENT NO.      : 6,878,176 B2
DATED           : April 12, 2005
INVENTOR(S)     : Christophe Roudet and Bertrand Budin It is certified that error appears in the above-identified patent and that said Letters Patent is hereby corrected as shown below:

Column 4,
Line 59, "Claim 1" should read -- Claim 4 --:

Column 6,
Line 6, before "comprises" insert -- wherein the container --.

Signed and Sealed this

Twenty-eighth Day of June, 2005

JON W. DUDAS
*Director of the United States Patent and Trademark Office*